(12) United States Patent
Snyder et al.

(10) Patent No.: US 7,799,225 B1
(45) Date of Patent: Sep. 21, 2010

(54) MEMBRANE CONTACTOR ASSISTED WATER EXTRACTION SYSTEM FOR SEPARATING HYDROGEN PEROXIDE FROM A WORKING SOLUTION, AND METHOD THEREOF

(75) Inventors: Seth W. Snyder, Lincolnwood, IL (US); Yupo J. Lin, Naperville, IL (US); Jamie A. Hestekin, Fayetteville, AR (US); Michael P. Henry, Batavia, IL (US); Peter Pujado, Kildeer, IL (US); Anil Oroskar, Oak Brook, IL (US); Santi Kulprathipanja, Inverness, IL (US); Sarabjit Randhava, Evanston, IL (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 934 days.

(21) Appl. No.: 11/536,905

(22) Filed: Sep. 29, 2006

(51) Int. Cl.
   *B01D 11/00* (2006.01)
   *C01B 7/19* (2006.01)
(52) U.S. Cl. ............... 210/644; 210/638; 423/584

(58) Field of Classification Search ............ 210/644, 210/650, 651, 638; 95/45, 46; 96/4, 6, 8, 96/10; 423/584, 585, 590
See application file for complete search history.

(56) References Cited

U.S. PATENT DOCUMENTS

| | | | | |
|---|---|---|---|---|
| 4,966,707 | A * | 10/1990 | Cussler et al. | 210/632 |
| 5,254,143 | A * | 10/1993 | Anazawa et al. | 95/46 |
| 5,662,878 | A * | 9/1997 | Datta et al. | 423/588 |
| 5,779,897 | A * | 7/1998 | Kalthod et al. | 210/321.8 |
| 6,402,818 | B1 * | 6/2002 | Sengupta | 96/6 |
| 6,805,731 | B2 * | 10/2004 | Cheng et al. | 96/8 |
| 6,830,737 | B2 * | 12/2004 | Ramstack | 422/256 |
| 7,122,166 | B2 * | 10/2006 | Parrish | 423/584 |
| 7,316,728 | B2 * | 1/2008 | Parekh et al. | 95/56 |
| 7,399,344 | B1 * | 7/2008 | Li et al. | 96/6 |
| 7,399,414 | B2 * | 7/2008 | Raeder et al. | 210/638 |

\* cited by examiner

*Primary Examiner*—Ana M Fortuna
(74) *Attorney, Agent, or Firm*—Mark C. Lang; Brian J. Lally

(57) ABSTRACT

The present invention relates to a membrane contactor assisted extraction system and method for extracting a single phase species from multi-phase working solutions. More specifically one preferred embodiment of the invention relates to a method and system for membrane contactor assisted water (MCAWE) extraction of hydrogen peroxide ($H_2O_2$) from a working solution.

10 Claims, 9 Drawing Sheets

MEMBRANE CONTACTOR ASSISTED WATER EXTRACTION SYSTEM FOR SEPARATING HYDROGEN PEROXIDE FROM A WORKING SOLUTION, AND METHOD THEREOF

STATEMENT OF GOVERNMENTAL SUPPORT

The United States Government has certain rights in this invention pursuant to Contract No. W-31-109-ENG-38 between the U.S. Department of Energy and the University of Chicago operating Argonne National Laboratory.

RELATION TO OTHER APPLICATIONS

This patent application is related to a U.S. patent application filed concurrently herewith; Ser. No. 11/536,933 entitled "MEMBRANE CONTACTOR ASSISTED EXTRACTION/REACTION SYSTEM EMPLOYING IONIC LIQUIDS AND METHOD THEREOF," which is hereby incorporated by reference in its entirety.

FIELD OF INVENTION

The present invention relates to a functionalized membrane contactor extraction system and method for extracting hydrogen peroxide from working solutions. One preferred embodiment of the invention relates to a method and system for membrane contactor assisted water extraction (MCAWE) of hydrogen peroxide ($H_2O_2$) from an organic working solution.

BACKGROUND OF INVENTION

Liquid-liquid separations of multi-phase solutions like those used in the production of hydrogen peroxide ($H_2O_2$) present a number of problems including but not limited to: emulsions, long separation times, and large capital expenses.

Most hydrogen peroxide manufacturing plants work on hydrogenation and subsequent oxidation of anthraquinone (or anthraquinone derivatives/analogs) dissolved in organics, typically yielding approximately 10-15 g/L hydrogen peroxide at the end of an operational cycle.

FIG. 6 illustrates one current method of producing hydrogen peroxide generally comprising the steps of: (1) hydrogenating an anthraquinone solution; (2) filtering the hydrogenated working solution: (3) optionally degassing the system; (4) oxidizing the hydrogenated working solution forming an oxidized working solution containing dissolved hydrogen peroxide; (5) separating the hydrogen peroxide from the oxidized working solution using traditional water extraction methods (i.e. liquid-liquid extraction columns etc) forming a raw aqueous hydrogen peroxide solution (containing contaminants); (6) purifying the raw aqueous hydrogen peroxide solution to remove contaminants; (7) and optionally distilling the purified aqueous hydrogen peroxide solution. See, PCT Application PCT/SE97/02100, International Publication No. WO 98/28225, which is hereby incorporated by reference in its entirety. A number of similar hydrogen peroxide processes have been developed. See, also U.S. Pat. Nos. 6,596,884; 6,982,072; 5,071,634; and U.S. Patent Application No. US2006/0057057, all of which are hereby incorporated by reference in their entireties.

Almost all known commercial methods for producing hydrogen peroxide use traditional water extraction methods (i.e. use of extraction columns) to separate hydrogen peroxide from the organic working solution. In such systems, the water and organic phases inevitable intermix leading to contamination of the resulting aqueous hydrogen peroxide solution. In addition, working solutions are designed to stabilize the catalyst, anthraquinone (AQ) and the hydrogenated form anthraquinol, in the presence of aqueous hydrogen peroxide. The lost of expensive catalyst AQ in the water phase during conventional liquid-liquid extraction increases the cost of $H_2O_2$ production. Cross-contamination between the aqueous and organic phases has been a long standing problem in the production of hydrogen peroxide. This contamination requires extra purification steps which are time and cost intensive.

Generally, $H_2O_2$ also needs to be diluted to certain concentrations (e.g., 5-10%) before it is used. If an efficient in-situ process for producing hydrogen peroxide at its desired concentrations is developed, the energy required for distillation and transport could be avoided. An added cost factor is that current processes to produce hydrogen peroxide in centralized facilities require hydrogen peroxide to be concentrated up to 70% to decrease volume for transport. These concentrated solutions require specialized stainless steel vessels and containers for storage and transport. In situ production avoids the need for centralized production and the component specialized vessels.

There exists a need in the art for a new liquid-liquid extraction method for separating hydrogen peroxide from a working solution which overcomes some or all of the problems associated with current methods.

BRIEF SUMMARY OF THE INVENTION

The present invention relates to a membrane contactor assisted water extraction (MCAWE) system and method for extracting a single phase species from multi-phase working solutions. More specifically one preferred embodiment of the invention relates to a method and system for MCAWE of hydrogen peroxide ($H_2O_2$) from a working solution.

The invented system and process utilizes an extracting membrane contactor (MC), which uses the membrane as a contactor only. A membrane contactor system works on the principal of using a membrane, which can be wetted by solution on one side of the membrane only, to serve as a contacting medium for the extraction. This set-up results in good extractant rates because the extracted component (i.e. $H_2O_2$) has a high affinity for the extractant, and preferably for the membrane surface as well. More importantly, however, is that the two-phases come into contact with each other in the membrane pores only and thus undesirable dissolution of the two phases into each other is much reduced.

In the case of extraction of $H_2O_2$ from an organic working solution, the MC is extremely advantageous because the reduction of the organics dissolved after the extraction to a significantly reduced concentration (<<500 mg/L) as well as the lost of catalyst (AQ). Thus, expensive post-processing such as activated carbon adsorption, distillation, etc., might be reduced or even eliminated.

The goal of a cost-effective, in-situ hydrogen peroxide production method can be accomplished by using scalable membrane-based approaches to capture $H_2O_2$ from the organic "working" solvents into an extraction solvent (e.g., water) for "on-site" $H_2O_2$ production.

The selectivity of the functionalized membrane contactor and extraction solvent act synergistically to improve the separation efficiency in comparison to direct liquid-liquid extraction process. The membrane contactor separations can operate at ambient temperatures and do not require energy to vaporize components. In comparison, the conventional liquid-liquid extraction requires two-phase separation of an emulsion, an inherently imprecise and messy process. The presently invented system employs the use of specialized membrane contactors which avoid introduction of water into the organic phase. The invented system and method can be integrated with known hydrogen peroxide production systems and processes. Additives introduced to the working solution to stabilize anthraquinone and anthraquinol in the presence of aqueous hydrogen peroxide could be minimized or even eliminated.

DETAILED DESCRIPTION OF THE PREFERRED EMBODIMENT

The present invention generally relates to a system for membrane contactor assisted water extraction of hydrogen peroxide from a working solution generally comprising:

1. at least one membrane contactor reactor (MCR) means for separating hydrogen peroxide from an organic working solution;
2. a working solution supply means for supplying a stream of working solution containing dissolved hydrogen peroxide to the MCR means; and
3. an extractant supply means for supplying a stream of extractant to the membrane contactor reactor means.

Figure 8:
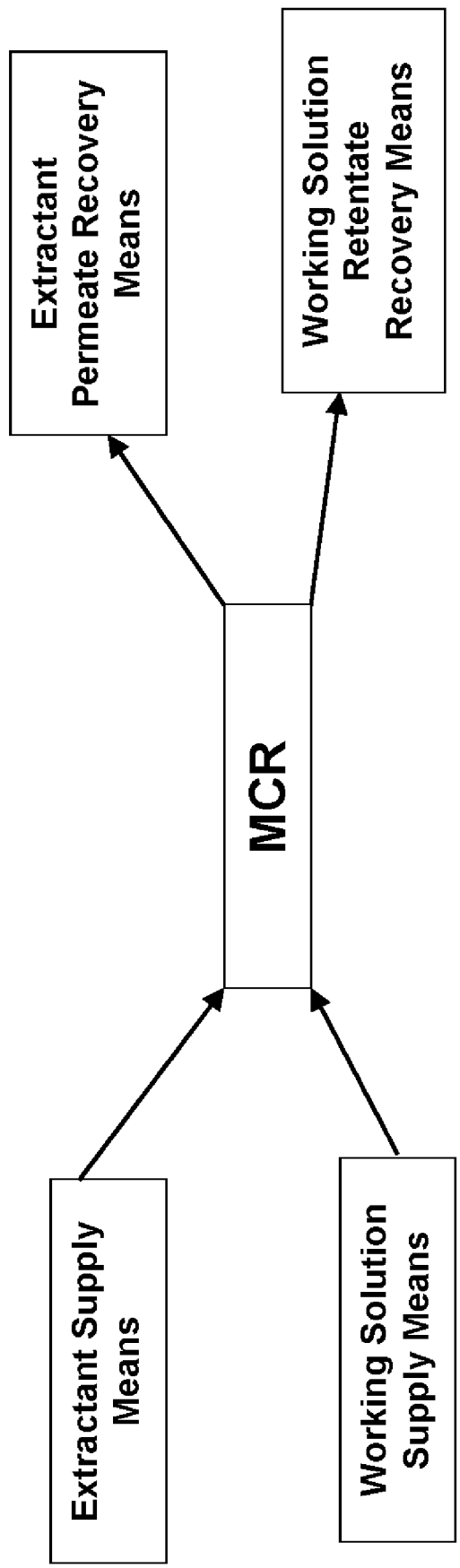
FIG. 8 is a schematic of a system for extraction of hydrogen peroxide from a working solution.

FIG. 8 is a schematic diagram of the one embodiment of the present invention generally comprising: an extractant supply means 410, a working solution supply means 411, a membrane contactor reactor 401, an extractant permeate recovery means 412, and a working solution retentate recovery means 413. The extractant and working solutions means provide streams of their respective solutions to the membrane contactor reactor means 401 which separates hydrogen peroxide from the working solution, forming a working solution retentate (having a reduced concentration of hydrogen peroxide) and a extractant permeate containing aqueous hydrogen peroxide. The extractant permeate being recovered by the extractant permeate recovery means 412 the working solution retentate being recovered by the working solution retentate recovery means 413.

Membrane Contactor Reactor

The membrane contactor reactor is a salient aspect of the invented system. In the most basic form, the membrane contactor (MC) reactor comprises a functionalized membrane acting as, and known as a membrane contactor, having a solution containing a desired species on one side of the membrane and an extractant (extraction solution) on the other side. The use of the terms membrane and membrane contactor in relation to MCR of the present invention are used interchangeably, as the membranes of the MCR present invention are necessarily membrane contactors.

Figure 9:
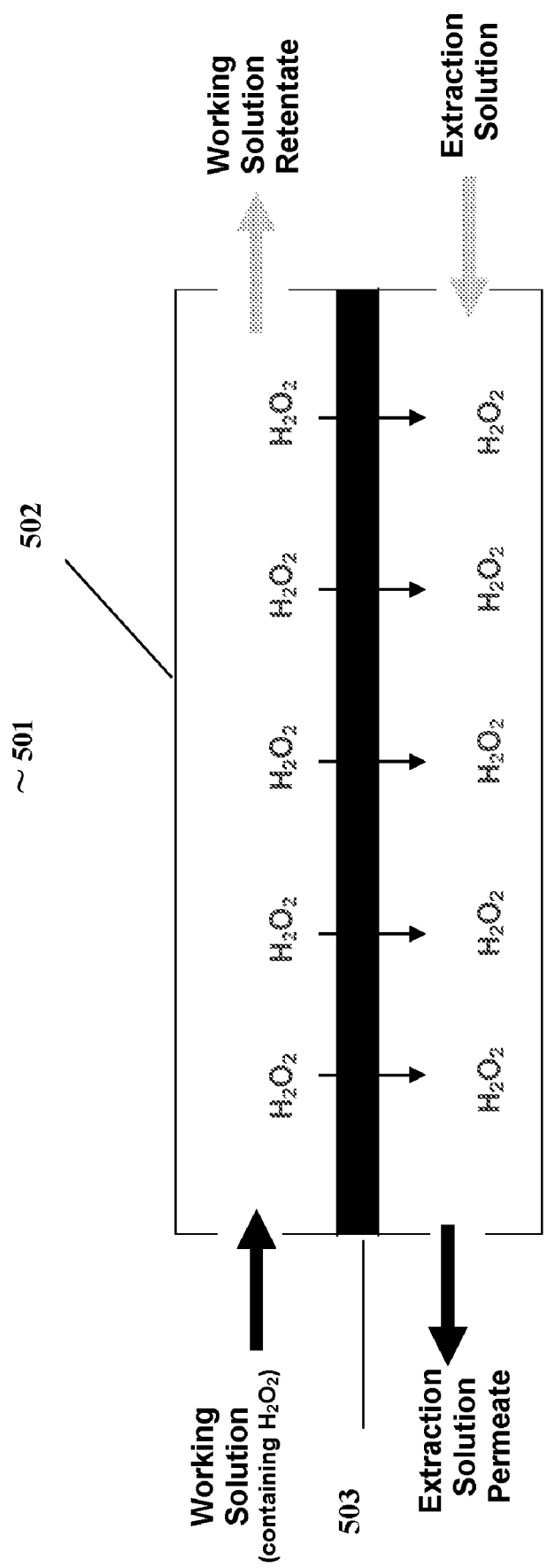
FIG. 9 is cut away view of a membrane contactor reactor of one embodiment of the present invention.

FIG. 9 illustrates one preferred embodiment the membrane contactor reactor 501 comprising: a membrane contactor 503 positioned within an outer housing 502 that encloses the membrane contactor in which the working solution containing $H_2O_2$ flows on one side of the membrane and the extractant flows on the other side. As the working solution flows along the membrane a portion of hydrogen peroxide is extracted from the working solution, across the membrane, and into the extractant forming an extractant permeate containing aqueous hydrogen peroxide. Preferably the two fluids flow parallel or near parallel to each other.

Membrane contactors reactors can be purchased as entire units (outer cylinder and membrane contactor) or constructed from separate components. Commercially available membrane contactor reactors can be purchased from CeraMem, which manufactures and sells membrane contactors as well as membrane contactor housings. (Waltham, Mass.).

Figure 1:
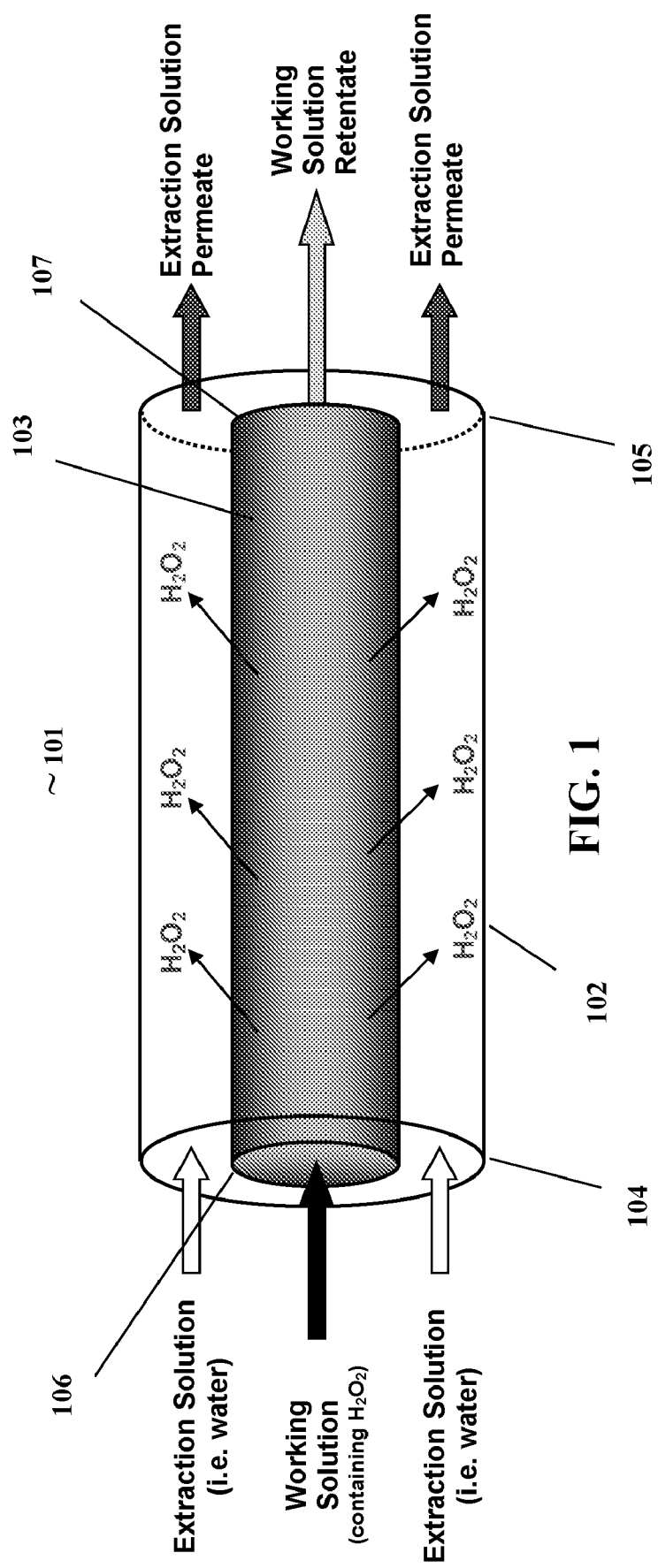
FIG. 1 is a schematic of one embodiment of the membrane contactor reactor system for separating hydrogen peroxide from a working solution.

FIG. 1 illustrates one preferred embodiment of a membrane contactor reactor for the invented membrane contactor assisted water extraction system. The illustrated membrane contactor reactor (MCR) 101 generally comprises an outer reactor cylinder (ORC) 102 having an inlet end 104 and an outlet end 105; and a coaxial cylindrical membrane contactor (CCMC) 103 positioned within the ORC 102. The CCMC also has an inlet end 106 end and outlet end 107. Another configuration is that multiple coaxial ORC's and CCMC's are present in a single MCR. For example, the Ceramem MCR is designed with a coaxial honeycomb structure.

The inlet end of the CCMC 106 receives a stream of working solution from a working solution supply means (not shown), and the inlet of the ORC 104 receives the stream of extractant from an extractant supply means (not shown); whereby the dissolved hydrogen peroxide present in the working solution is extracted through the membrane into the extractant creating a extractant permeate solution (containing aqueous hydrogen peroxide) which exits the outlet of the ORC 105. As the working solution passes through the reactor the concentration of hydrogen peroxide present in the working solution is reduced, the working solution ultimately exiting the CCMC outlet 107 as a working solution retentate. The illustrated system employs a co-current flow scheme in which the extractant and working solutions flow in the same direction, however, the solutions could stream in a counter-current arrangement as well.

It should also be noted that the working solution can be flowed through the ORC and the extractant through the CCMC, as shown in some of the embodiments below.

Figure 2:
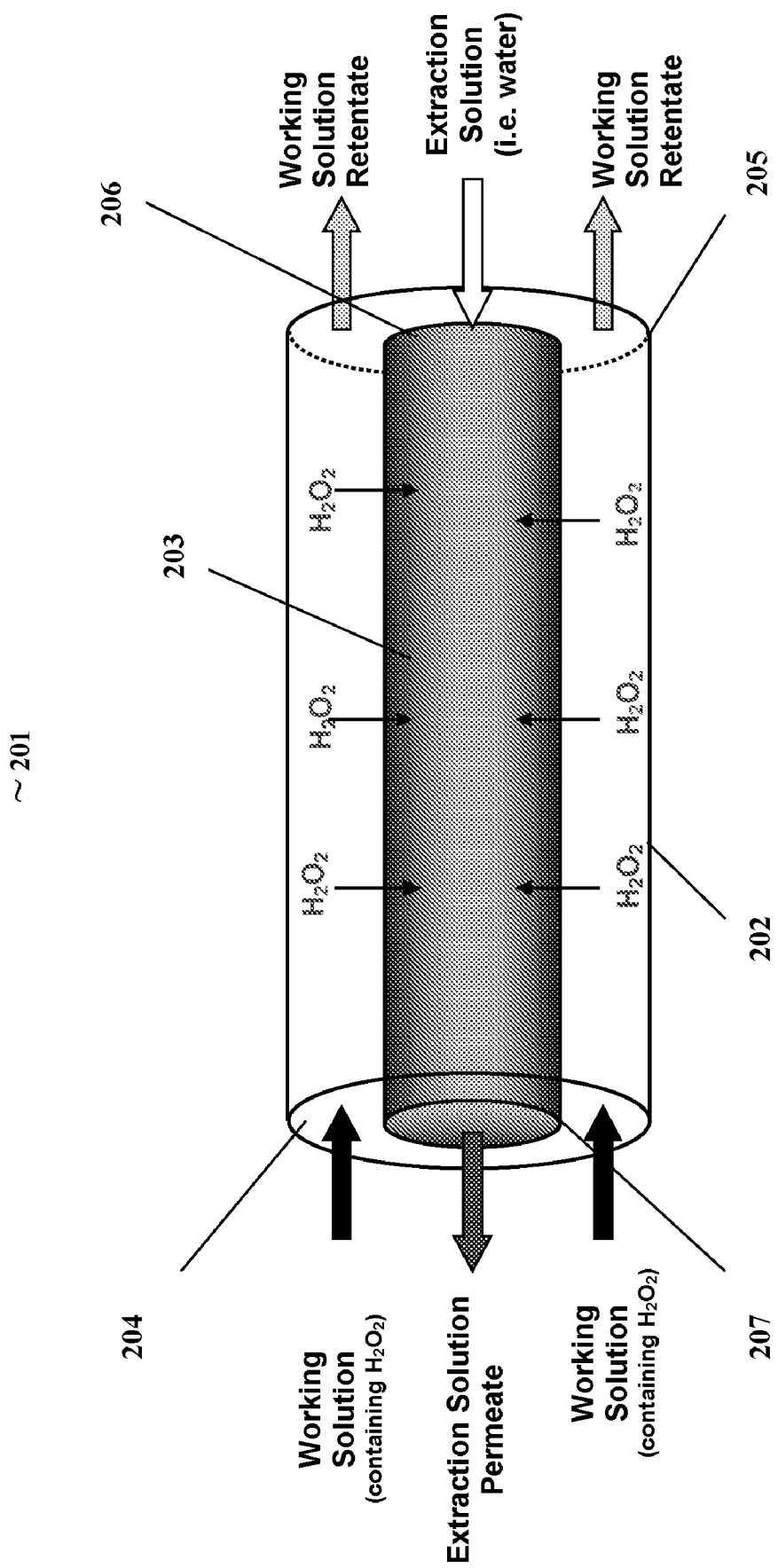
FIG. 2 is a schematic of another embodiment of the membrane contactor reactor system for separating hydrogen peroxide from a working solution.
Figure 3:
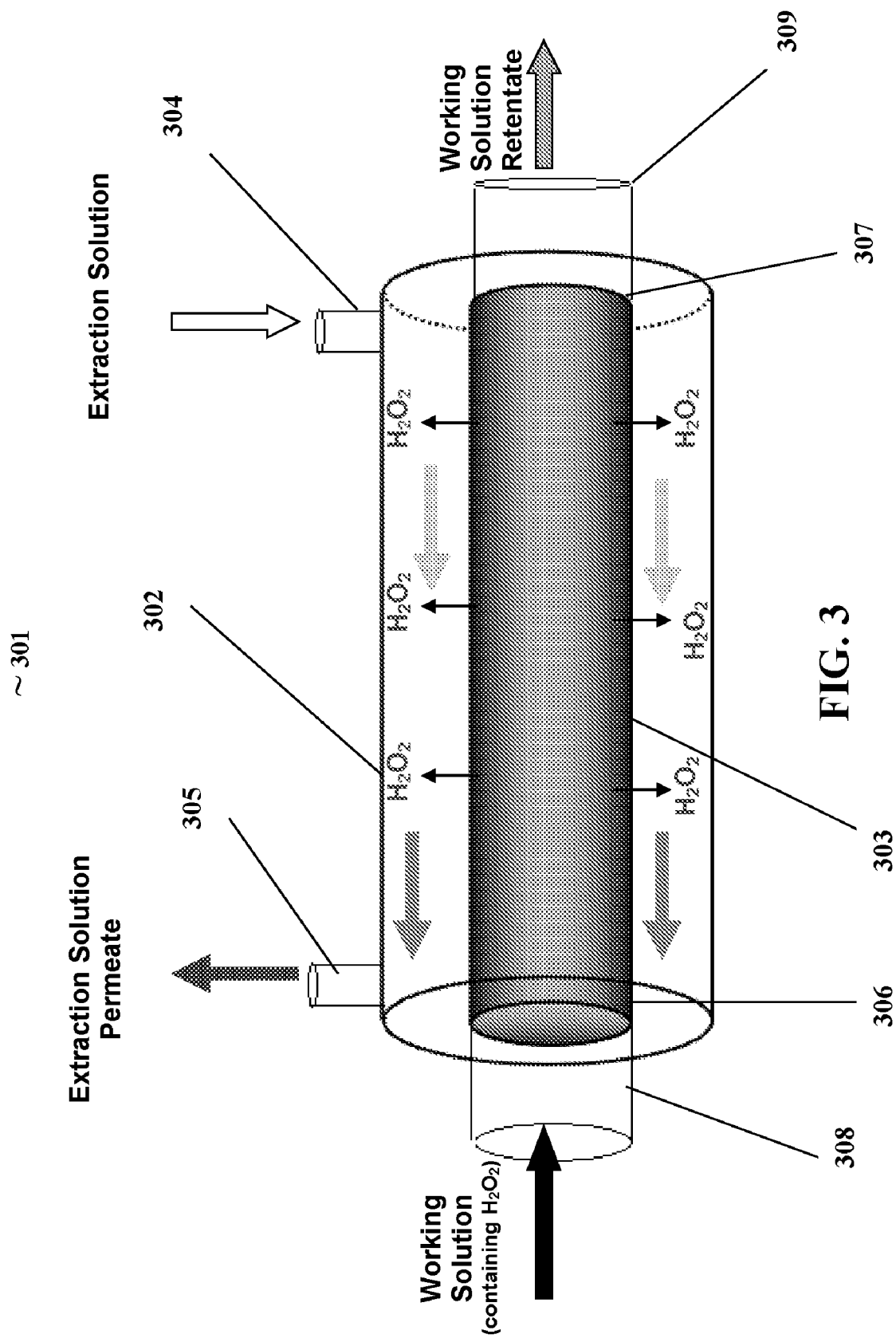
FIG. 3 is a schematic of yet another embodiment of the membrane contactor reactor system for separating hydrogen peroxide from a working solution.

The illustrated embodiment of membrane contactor (and MCR) has a cylindrical shape with a central aperture running the length of the membrane as shown in FIGS. 1-3. The cylindrical membrane maximizes the surface interaction between the working solution and extraction solution while still maintaining phase separation between the solutions. Although, a cylindrical membrane (and reactor) is preferred, linear, and other various shaped membranes and reactors, with or without multiple coaxial channels can be employed.

FIG. 2. illustrates another embodiment of a membrane contactor reactor for the invented membrane contactor assisted water extraction system. The illustrated membrane contactor reactor (MCR) 201 generally comprises an outer reactor cylinder (ORC) 202 having an inlet end 204 and an outlet end 205; and a coaxial cylindrical membrane contactor CCMC 203 positioned within the ORC 202. The CCMC 203 also having an inlet end 206 end and outlet end 207.

The inlet end of the ORC 204 receives a stream of working solution from a working solution supply means (not shown), and the inlet of the MC 206 receives a stream of extractant from an extractant supply means (not shown); whereby the dissolved hydrogen peroxide present in the working solution permeates through the membrane into the extractant creating a extractant permeate solution (containing aqueous hydrogen peroxide) which exits the outlet of the CCMC 207. As the working solution passes through the reactor the concentration of hydrogen peroxide present in the working solution is reduced, the working solution ultimately exiting the ORC outlet 206 as a working solution retentate. The illustrated system employs a counter-current flow scheme in which the extractant and working solutions flow in opposite directions, however, the solutions could stream in a co-current arrangement as well.

FIG. 3 illustrates yet another embodiment of a membrane contactor reactor for the invented membrane assisted water extraction system. The illustrated membrane contactor reactor (MCR) 301 generally comprises an outer reactor cylinder (ORC) 302, having an ORC inlet 304 and an ORC outlet 305; and a coaxial cylindrical membrane contactor CCMC 303 positioned within the ORC 302. The CCMC having an inlet end 306 end and outlet end 307. The ORC further having a CCMC inlet 308 and CCMC outlet 309. The CCMC inlet connected to the inlet end of the CCMC, the CCMC outlet connected to the CCMC outlet end 309. The ORC 302 is an enclosed hollow cylinder with the exception of the ORC inlet and outlet, and CCMC inlet and outlet.

The ORC inlet and outlet provide fluid communication between the outside and inside of the ORC. The CCMC inlet and outlet provide fluid communication between the outside and the central aperture of the CCMC. The CCMC can be attached and supported within the ORC in a variety of means known in the art, including physical and chemical bonding agents and devices. For more information regarding membrane contactor reactors see U.S. Pat. No. 6,830,737 and Published U.S. patent application Ser. No. 11/153,534 which are incorporated by reference in their entireties. The illustrated system employs a counter-current flow scheme in which the extractant and working solutions flow in opposite directions, however, the solutions could stream in a co-current arrangement as well The inlet of the ORC 304 receives a stream of working solution from a working solution supply means (not shown), and the inlet of the CCMC 306 receives a stream of extractant from an extractant supply means (not shown); whereby the dissolved hydrogen peroxide present in the working solution permeates through the membrane into the extractant creating a extractant permeate solution (containing aqueous hydrogen peroxide) which exits the outlet of the CCMC 305. As the working solution passes through the reactor the concentration of hydrogen peroxide present in the working solution is reduced, the working solution ultimately exiting the CCMC outlet end 307 and outlet 309 as a working solution retentate. For more information regarding membrane contactor reactors see U.S. Pat. No. 6,830,737 and Published U.S. patent application Ser. No. 11/153,534 which are incorporated by reference in their entireties.

Functionalized Membrane Contactor

The functionalized membrane is a salient aspect of the present invention. A preferred membrane material has high porosity, uniform pore sizes, the ability to wet one phase only, and a relatively high contact angle with the other phase. High porosity can create high contact area for the two liquid phases. The high contact angle of one liquid phase against the solid membrane surface would minimize the specific liquid phase to cross over the porous membrane. The role of the membrane contactor in the MCR system is to keep the phases of the working solutions and extractant separated and to provide an interface between the two phases. The interface between the two phases is immobilized by using functionalized membranes and a small trans-membrane pressure gradient (i.e. ~0.1 bar). The functionalization and other details of the membrane are discussed below.

In general, any membrane with properly functionalized surfaces can be used a membrane contactor. The membrane can be constructed out of a variety of materials. Suitable materials include but are not limited to: silicon dioxide, alumina, silica, stainless steel, and Nafion™ (DuPont, Willmington, Del.), and cellulose. When used to extract species such as hydrogen peroxide, the membrane material must also be resistant to oxidizers and/or different kinds of solvents. One preferred membrane is a Ceramem ceramic membrane (silicon carbide) having an internal surface area of about 1000 $m^2/m^3$. (Waltham, Mass.). One exemplary membrane is 1 inch in diameter, 12 inches long and has pore size around 5 nm.

The pore size of the membrane for use in separation of hydrogen peroxide can generally be up to about 2 μm in size, preferably the pores are between about 1 nm and 10 nm.

The performance of MCs in liquid-liquid separations strongly depend on the properties of the membranes employed and their relation to the wetting and non-wetting solutions. An important criteria for selected a proper membrane is the wettability or liquid-solid contact angle of the membrane by the working solution or extractant solutions. Normally, high wettability means low contactor angle between the contact surface of liquid and solid. Typically the solvent acts as the wetting solution, however, this is not always the case.

Wetting (or contacting) refers to how the starting solution or extractant wets or fills the pores of the membrane and developing an interface with the other solution. As noted herein, either solution may wet or fill the pores depending upon the system parameters. The interface between the starting solution and extractant can be controlled by differential pressures as discussed herein and as further discussed by U.S. Pat. No. 4,966,707 which is hereby incorporate by reference in its entirety.

In general, the surface of the chosen membrane should be functionalized, or have properties (i.e. be hydrophilic or hydrophobic) that are similar to the wetting liquid and preferably opposite to the non-wetting solution.

Figure 4:
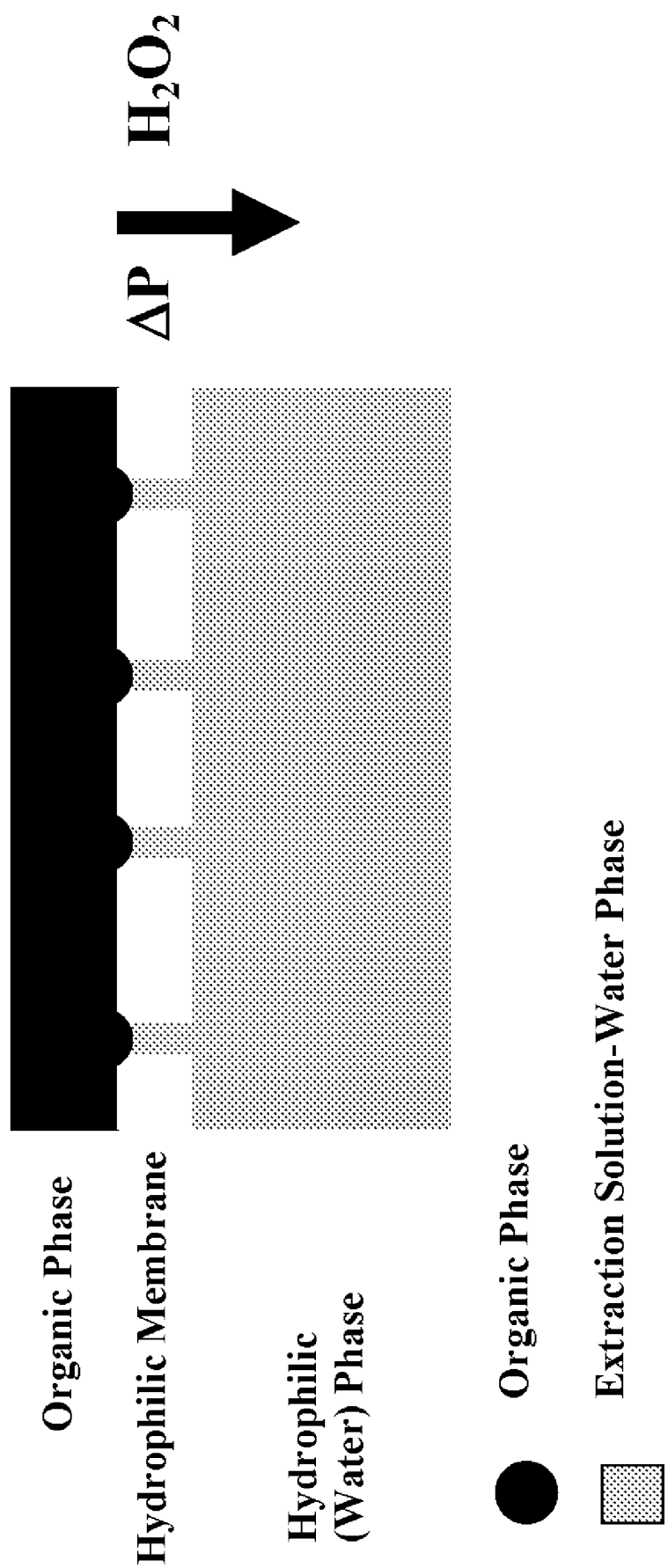
FIG. 4 is a partial cut away of a membrane contactor reactor system of the present invention employing a hydrophilic membrane and hydrophilic (i.e. water) extractant.

FIG. 4 illustrates a preferred embodiment of the invented system wherein the membrane contactor is hydrophilic, a hydrophilic solution, water acts as the extractant and as the wetting liquid, and the organic working solution (being very hydrophobic) acts as the non-wetting liquid. The membrane's affinity for hydrogen peroxide present in the working solution acts synergistically with the water extractant (which also has an affinity of hydrogen peroxide) to increase the ability of the hydrogen peroxide to permeate into the extractant. In the illustrated arrangement, the organic working solution is preferably slightly pressurized, thus the water extractant will wet the membrane but the organic phase will not go through and only an extraction takes place. If a hydrophobic membrane were being used then one would pressurize the system the other way.

When pressurizing the system, the positive pressure applied, by the pressurized solution, on the membrane contactor cannot exceed the osmotic pressure of the solution which is wetting the membrane. For example, in the illustrated system of FIG. 4, the positive pressure applied on the membrane from the pressurized working solution should not exceed the osmotic pressure of the water such that the working solution will not breakthrough the membrane into the extraction solvent.

Preferably, the pressure of the non-wetting solution is elevated to a slightly higher value than that of the wetting solution creating a pressure gradient $\Delta P$ across the membrane which helps maintain the interface between the two phases. The pressure of the non-wetting solution, however, must not exceed a critical threshold known as the breakthrough pressure (i.e. the pressure at which the non-wetting solution will penetrate the membrane). The Laplace equation offers a relationship between the pore size of the membrane, $r_{pore}$ and the breakthrough pressure, $\Delta P$:

$$\Delta P = (2\Theta\gamma \cos \theta)/r$$

Here $\gamma$ is the interfacial tension, $\Theta$ is a geometric factor related to the pore structure (equal to 1 for cylindrical pores) and $\theta$ is the liquid-liquid contact angle. Thus, breakthrough pressures can be calculated for various systems. Breakthrough pressure data for several membrane types and fluids can be found in the literature. (See, Membrane Contactors, in Membrane Separation Technology, Principles and Applications, Reed, B. W. et al., 1995 (Elsevier), which is hereby incorporated by reference in its entirety. The pressure gradient can be created and maintained using a number of means well known in the art, including use of various pressure/flow meters and controls.

For most testing the pressure was generally maintained at about 5 psi. Depends on the extraction solvent and the pressures can be ranged from 1 to 15 psig.

Outer Reactor Cylinder (ORC)

The ORC (or outer container) can be constructed of a myriad of materials including but not limited to: ceramics, various metals, and plastics such as PVC. As described earlier the ORC may be incorporated into a prefabricated MCR.

Extraction Solution (and Supply Means)

A salient aspect of the present invention is the extraction solution. The extraction solution can be virtually any solution having an affinity for hydrogen peroxide, more preferably a high affinity for hydrogen peroxide (e.g., high solubility of hydrogen peroxide). A preferred extractant is an aqueous solution, more preferably water.

Preferably the extractant has an affinity for hydrogen peroxide, more preferably a strong affinity for hydrogen peroxide. In a preferred system, the membrane and extractant both have an affinity for hydrogen peroxide and act synergistically to extract hydrogen peroxide from the working solution.

The extractant can be supplied to the MCR in a variety of means known in the art including but not limited to liquid pumps.

Working Solution (and Supply Means)

The working solution ($WS_{MCR}$) streamed into the MCR can be any of a myriad of organic working solutions containing dissolved hydrogen peroxide. Since most commercial methods for producing hydrogen peroxide utilize an anthraquinone (or anthraquinone derivative/analog) based working solution, the $WS_{MCR}$ is preferably an anthraquinone based working solution containing dissolved hydrogen peroxide. There are other processes for producing hydrogen peroxide such as the direct catalytic reaction of hydrogen and oxygen.

The production of anthraquinone based working solutions containing dissolved hydrogen peroxide are well known in the art. See, U.S. Pat. Nos. 5,147,628; 5,071,634; 5,296,104; 6,224,845; 6,596,884 and 6,982,072, See, also Ullmann's Encyclopedia of Industrial Chemistry, $5^{th}$ ed., vol. A13 pp 447-456; all of which are hereby incorporated by reference in their entireties.

A suitable $WS_{MCR}$ comprises: dissolved hydrogen peroxide. A preferred $WS_{MCR}$ comprises dissolved hydrogen peroxide; one or more members of the group consisting of: anthraquinone (AQ), (tetrahydro)antrhaquinone (THAQ) and analogs and derivatives thereof; and various polar and/or non-polar solvents.

The presently invented system's ability to limit the contact between the aqueous and organic phases during separation may allow the use of new or previous unpractical working solutions.

The $WS_{MCR}$ can be supplied to the MCR in a variety of means known in the art including but not limited to liquid pumps.

Recovery Means

As shown in FIG. 8 extraction recovery means for the extraction permeate and working solution retentate can be employed to recover the solutions as they exit the respective outlets of the membrane contactor reactor. Various recovery means known in the art can be employed including but not limited to storage vessels.

Alternatively, a portion of the solutions can be regenerated and/or recycled back into other parts of a hydrogen peroxide system. For example, if a higher concentration of hydrogen peroxide is required, the extraction solvent could be recycled through the MCR multiple times to increase the hydrogen peroxide concentration. The system can also employ multiple MCRs.

Method for Extracting Hydrogen Peroxide from a Working Solution 1. providing a membrane contactor reactor system, the membrane contactor system having a membrane with a working solution side and an extractant side;
2. providing an aqueous extractant;
3. providing a working solution, the working solution containing a concentration of dissolved hydrogen peroxide;
4. wetting the membrane with the extractant or working solution;
5. streaming the working solution along the starting solution side of the membrane contactor; and
6. streaming the extraction solution along the extractant side of the membrane contactor;
    wherein at least a portion of the dissolved hydrogen peroxide is extracted from the working solution across the membrane into the extractant forming an extractant permeate.

Suitable membrane contactor reactors, working solutions, extractants and other details have been described above. The extractant and $WS_{MCR}$ can be streamed in co-current or counter current orientations. The invented method reduces or even eliminates the step of purifying the extractant permeate as required by previous hydrogen peroxide extraction methods.

The flow rates of the WS and water can be varied according to desired results and other factors. Exemplary flow rates of WS and water (extractant) are about 500 ml/min and 100 ml/min, respectively. An exemplary positive pressure of about 5 psiag across the membrane surface of the WS stream side can be applied by back pressure.

Method for Producing Hydrogen Peroxide Employing MCAWE

One embodiment of the invention relates to a novel process for producing hydrogen peroxide employing the MCAWE. The method generally comprises the following steps:
1. hydrogenating a starting working solution forming a hydrogenated working solution;
2. filtering the hydrogenated working solution;
3. oxidizing the hydrogenated working solution forming an oxidized working solution containing dissolved hydrogen peroxide;
4. separating the hydrogen peroxide from the oxidized working solution using MCAWE where an aqueous hydrogen peroxide solution (essentially free of contaminants) is obtained,
5. recovering the aqueous hydrogen peroxide solution; and optionally purifying the aqueous hydrogen peroxide solution;
optionally distilling the aqueous hydrogen peroxide solution;

Many of the steps of the process are well known in the art, with the notable exception of the separation step employing the novel MCAWE process, which eliminates the need for additional purification steps required by previous methods. See, PCT Application PCT/SE97/02100, International Publication No. WO 98/28225, which is hereby incorporated by reference in its entirety. A number of similar hydrogen peroxide processes have been developed. See, also U.S. Pat. Nos. 6,596,884; 6,982,072; 5,071,634; and U.S. Patent Application No. US2006/0057057, all of which are hereby incorporated by reference in their entireties.

The hydrogenation of the starting organic solution (i.e. anthraquinone) is usually carried out in a hydrogenating reactor by means of hydrogen gas and a catalyst which can be present in a solid dispersed condition in the anthraquinone solution. Other types of catalysts may also be used. One suitable catalyst is the metal palladium, which can be applied in a very thin layer on inert vehicle granules, such as zeolite (AlSi).

Various starting working solutions are known in the art. Generally these starting solutions comprise: alkylanthrquinone(s), and a solvent system such a two solvent system containing both a polar and non-polar solvent. A suitable starting solution is described in PCT Application PCT/SE97/02100, International Publication No. WO 98/28225, which is hereby incorporated by reference in its entirety. See, also U.S. Pat. No. 5,147,628 which describes various alkylanthraquinones, solvents, and working solutions, which is also hereby incorporated by reference in its entirety.

Typically the hydrogen is allowed to flow into the bottom part of the reactor whereupon stirring of the reaction mixture occurs when the hydrogen bubbles move upwards. To ensure that only a hydrogenating of the double bound oxygen atoms of the anthraquinone shall occur without the formation of too many by-products, the reaction is preferably carried out at a temperature of about 40° C. The hydrogenated anthraquinone remains in solution. The pressure in the hydrogenating reactor is usually up to an overpressure of a few atmospheres.

Most known processes are continuous and a part of the working solution preferably is therefore taken out continuously from the hydrogenating reactor while new, non-hydrogenated working solution is added. The hydrogenated working solution is filtered after it has been taken out in one or more filters and is thereafter often optionally degassed.

The hydrogenated working solution is then oxidized by means of oxygen or air, usually in an oxidation tower. The oxidation usually occurs in a co-current, but it also occurs in some cases in counter-current.

After the oxidation the working solution contains dissolved hydrogen peroxide, and the hydrogen peroxide is extracted from the $WS_{MCR}$ using the novel methods and membrane contactor reactor system as described above in detail.

Results

Figure 5:
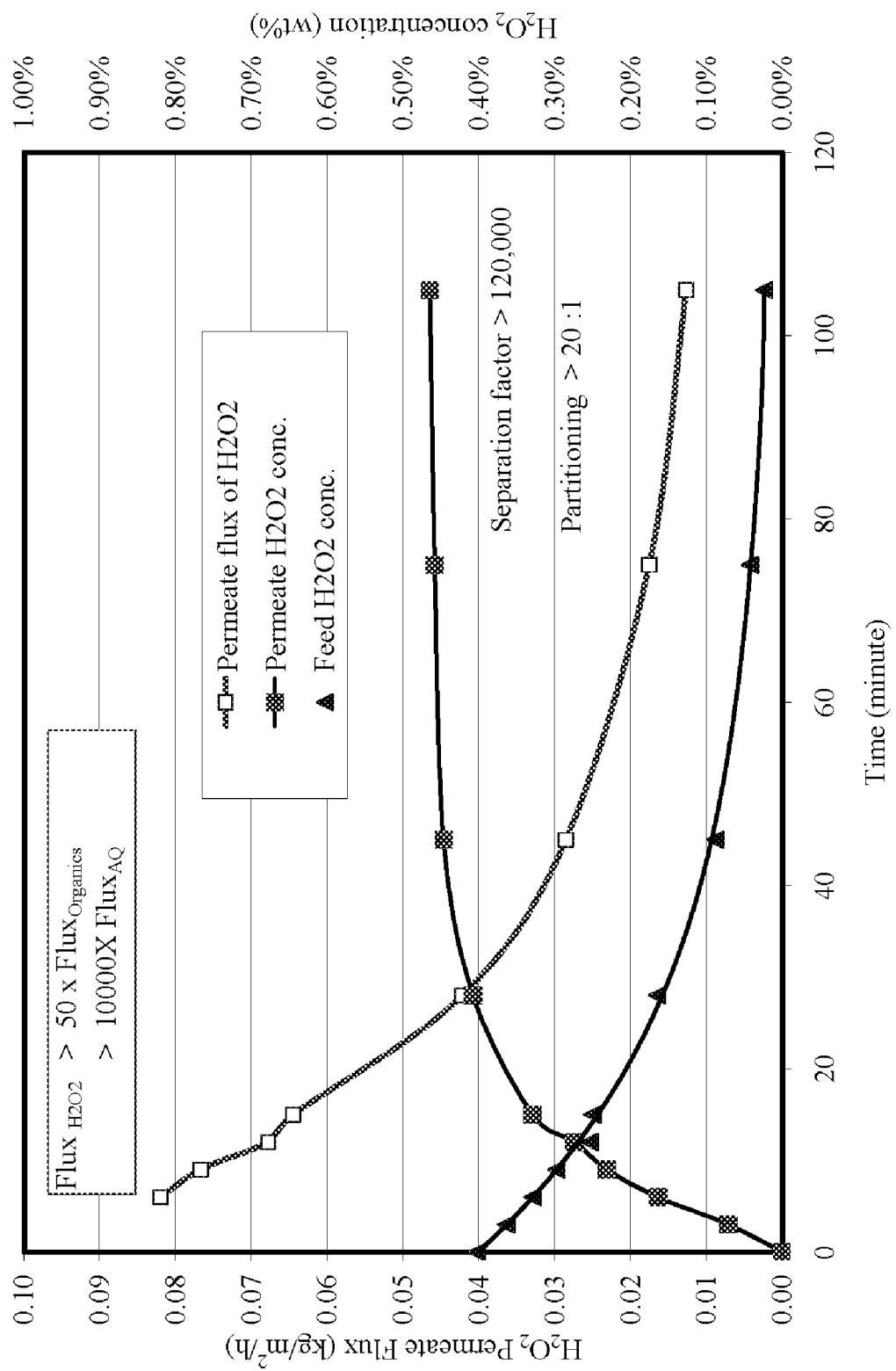
FIG. 5 is a graph of time v. hydrogen peroxide concentration illustrating the membrane flux of the present invention.
Figure 6:
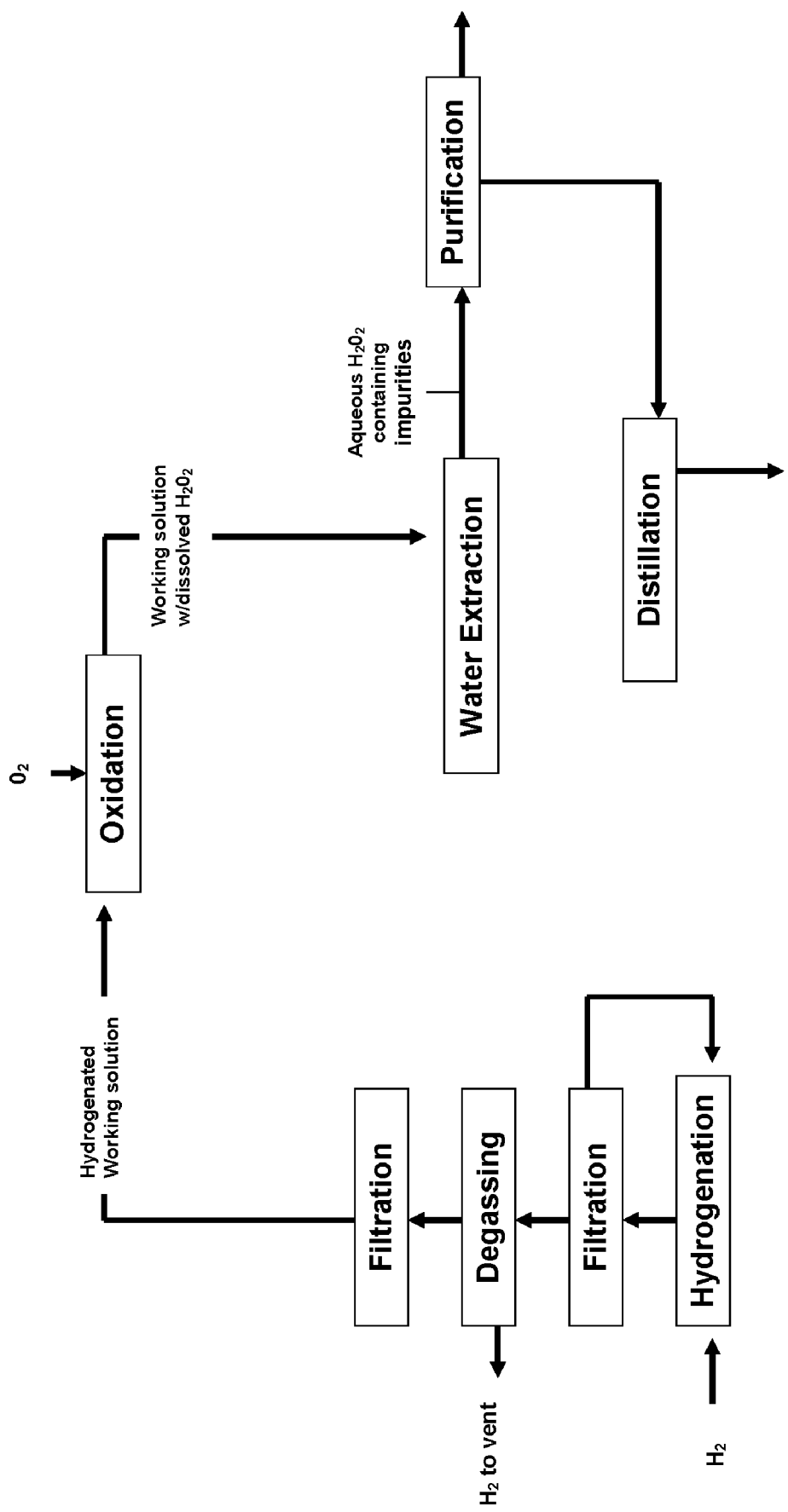
FIG. 6 is schematic of a prior art method for the production of hydrogen peroxide.
Figure 7:
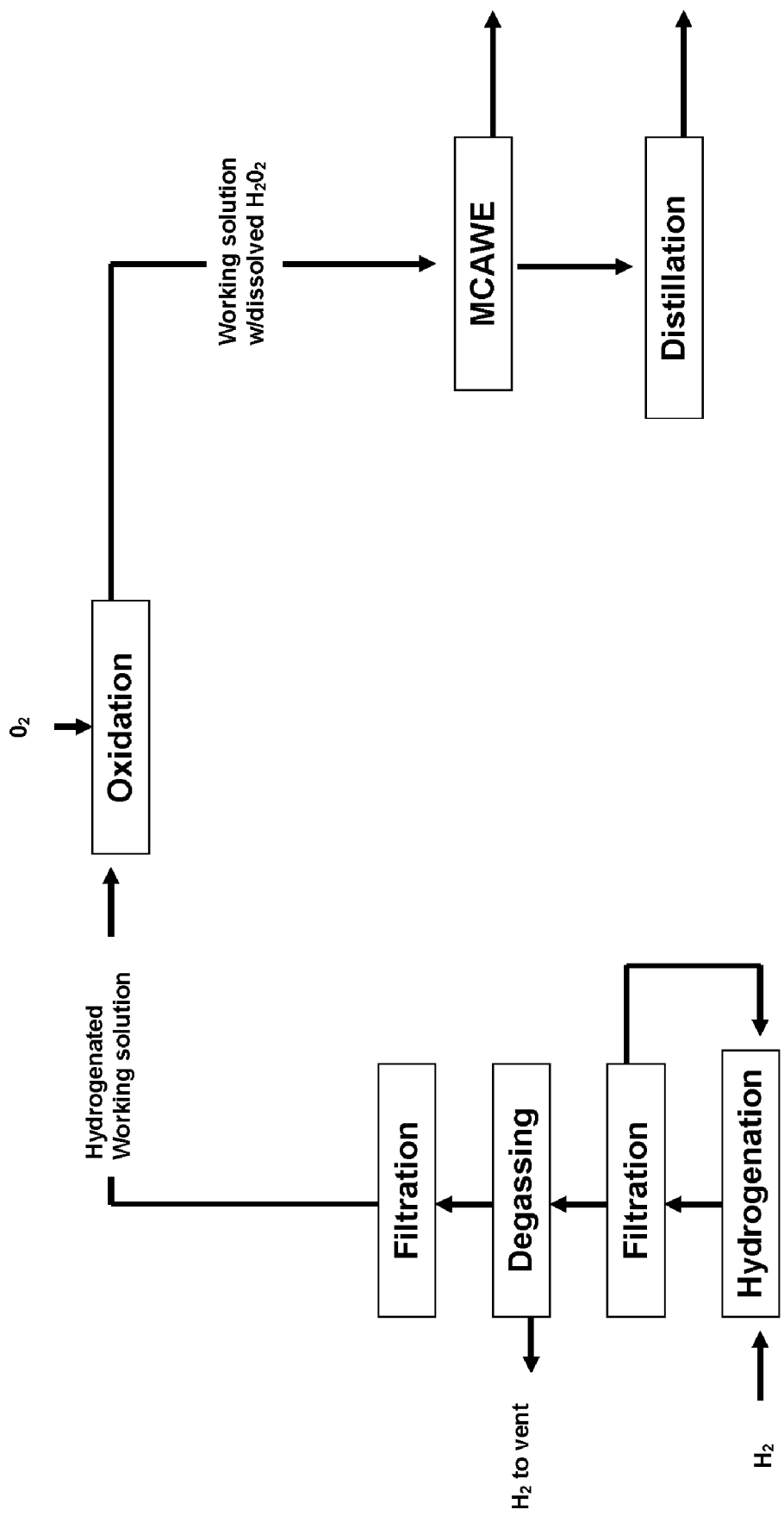
FIG. 7 is schematic illustrating one embodiment of the invented process for the production of hydrogen peroxide.

FIG. 5 shows experimental results of the flux of $H_2O_2$ extracted from the working solution. The separation efficiency (or factor) was calculated to be extremely high at 70000 with partition coefficient of 20. The permeate flux of $H_2O_2$ were 50× and 10000×, respectively, more than the permeate fluxes of WS and the catalyst (AQ). The loss of catalyst (AQ) to the extractant (i.e., water) was less than 0.015%. Less than 0.003% of the WS was transported to the water phase after 100 minutes operation. The data indicates that MCAWE provides extremely high selective extraction of $H_2O_2$ with very low lost of catalyst and WS during the extraction.

Having described the basic concept of the invention, it will be apparent to those skilled in the art that the foregoing detailed disclosure is intended to be presented by way of example only, and is not limiting. Various alterations, improvements, and modifications are intended to be suggested and are within the scope and spirit of the present invention. Additionally, the recited order of the elements or sequences, or the use of numbers, letters or other designations therefore, is not intended to limit the claimed processes to any order except as may be specified in the claims. All ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as up to, at least, greater than, less than, and the like refer to ranges which can be subsequently broken down into sub-ranges as discussed above. Accordingly, the invention is limited only by the following claims and equivalents thereto.

All publications and patent documents cited in this application are incorporated by reference in their entirety for all purposes to the same extent as if each individual publication or patent document were so individually denoted.

What is claimed is:

1. A process for separation of hydrogen peroxide from a working solution comprising the following steps:
   providing a liquid-liquid membrane contactor assisted extraction system, the membrane contactor assisted extraction system having a porous membrane with a working solution side and an extractant side;
   providing an extractant, wherein the extractant is water,
   providing a working solution, wherein the working solution comprises dissolved hydrogen peroxide and at least one organic solvent;
   wetting the membrane with the extractant or working solution wherein a liquid-liquid interface (contact) is established between the working solution and extractant in the membrane pores;
   streaming the working solution along the working solution side of the membrane contactor; and streaming the extractant along the extractant side of the membrane contactor; and, optionally purifying the extractant permeate;

wherein at least a portion of the dissolved hydrogen peroxide is extracted from the working solution across the membrane into the extractant forming an extractant permeate.

2. The process of claim 1, further comprising the step of recovering the extractant permeate.

3. The process of claim 1, wherein the membrane and extractant are both hydrophilic.

4. The process of claim 1, further comprising the step of: creating and maintaining a pressure gradient between the working solution and extractant sides of the membrane.

5. The process of claim 1, wherein the temperature in the membrane contactor assisted extraction system is approximately room temperature.

6. The process of claim 1, wherein the extraction of hydrogen peroxide from the working solution, across the membrane and into the extractant is due to a higher affinity of hydrogen peroxide for the extractant rather than the working solution.

7. A method for producing hydrogen peroxide comprising the following steps:

a. hydrogenating an organic starting working solution forming a hydrogenated working solution;

b. optionally filtering the hydrogenated working solution;

c. oxidizing the hydrogenated working solution forming an oxidized working solution containing dissolved hydrogen peroxide;

d. separating the hydrogen peroxide from the oxidized working solution using liquid-liquid membrane contactor assisted extraction, wherein a porous membrane contactor establishes a liquid-liquid interface (contact) between the working solution and an extractant in the membrane pores, wherein the extractant is water and wherein an aqueous hydrogen peroxide solution is obtained, and optionally purifying the aqueous hydrogen peroxide solution;

optionally distilling the aqueous hydrogen peroxide.

8. The method of claim 7, wherein the starting working solution comprises anthraquinone.

9. The method of claim 7, wherein the separation of hydrogen peroxide from the working solution is performed at approximately room temperature.

10. The method of claim 7, wherein the separation of hydrogen peroxide from the working solution is due to a higher affinity of hydrogen peroxide for the extractant rather than the working solution.

* * * * *